Aug. 12, 1969

H. TOLAR 3,460,324

CANE HARVESTING MACHINE

Filed Feb. 10, 1966

Homer Tolar
INVENTOR.

BY *Clarence A. O'Brien*
and *Harvey B. Jackson*
Attorneys

Aug. 12, 1969  H. TOLAR  3,460,324
CANE HARVESTING MACHINE
Filed Feb. 10, 1966  6 Sheets-Sheet 2
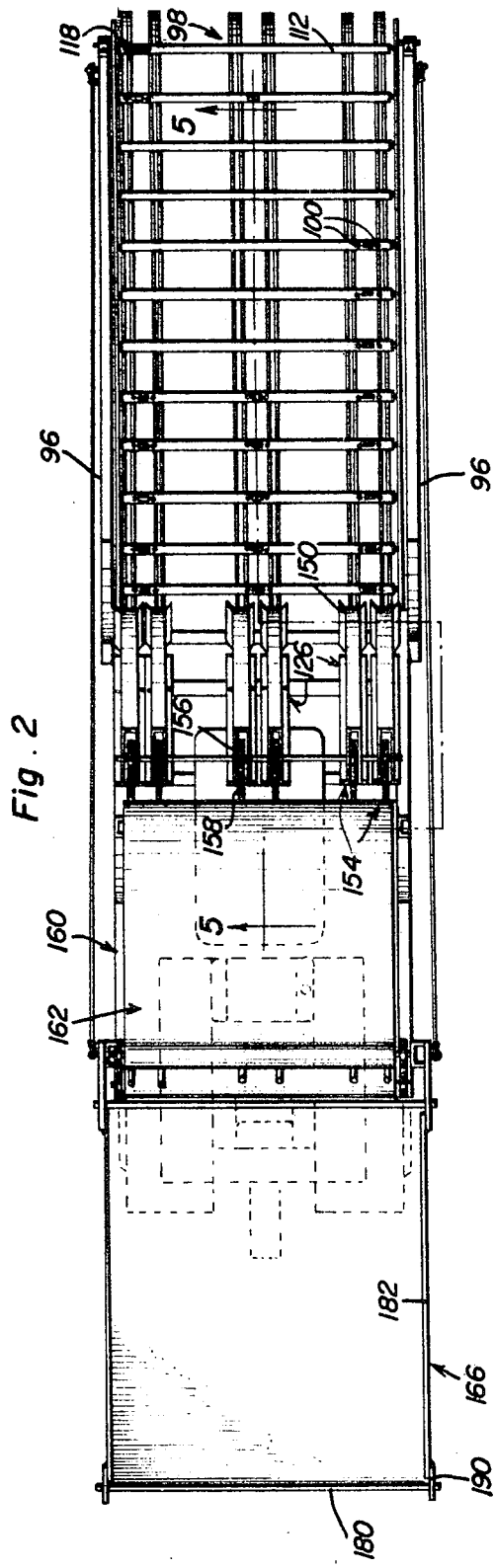
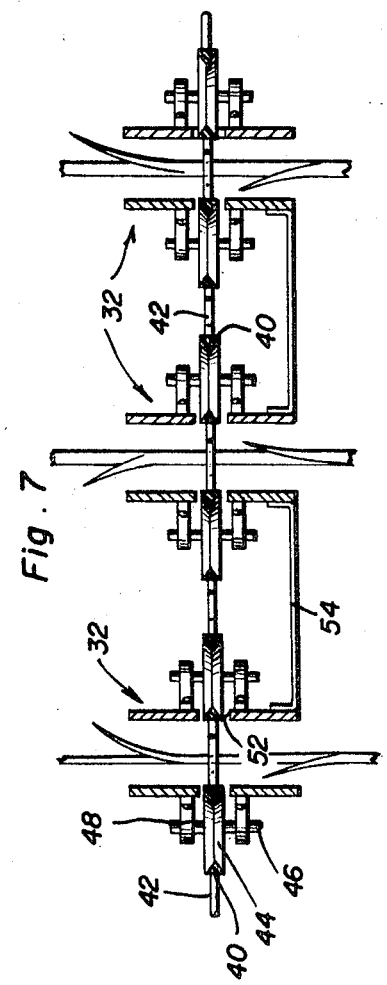
Homer Tolar
INVENTOR.
BY Clarence A. O'Brien
and Harvey B. Jacobson
Attorneys

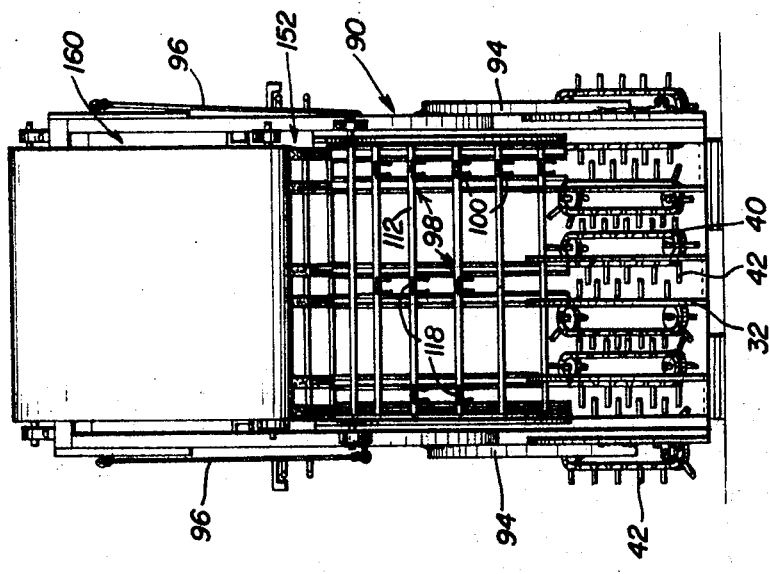
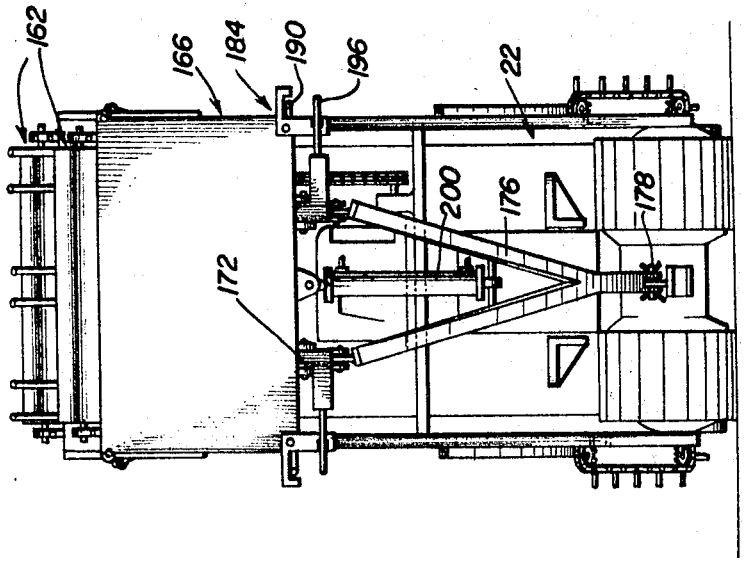
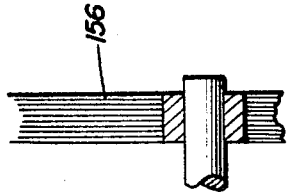
Homer Tolar
INVENTOR.

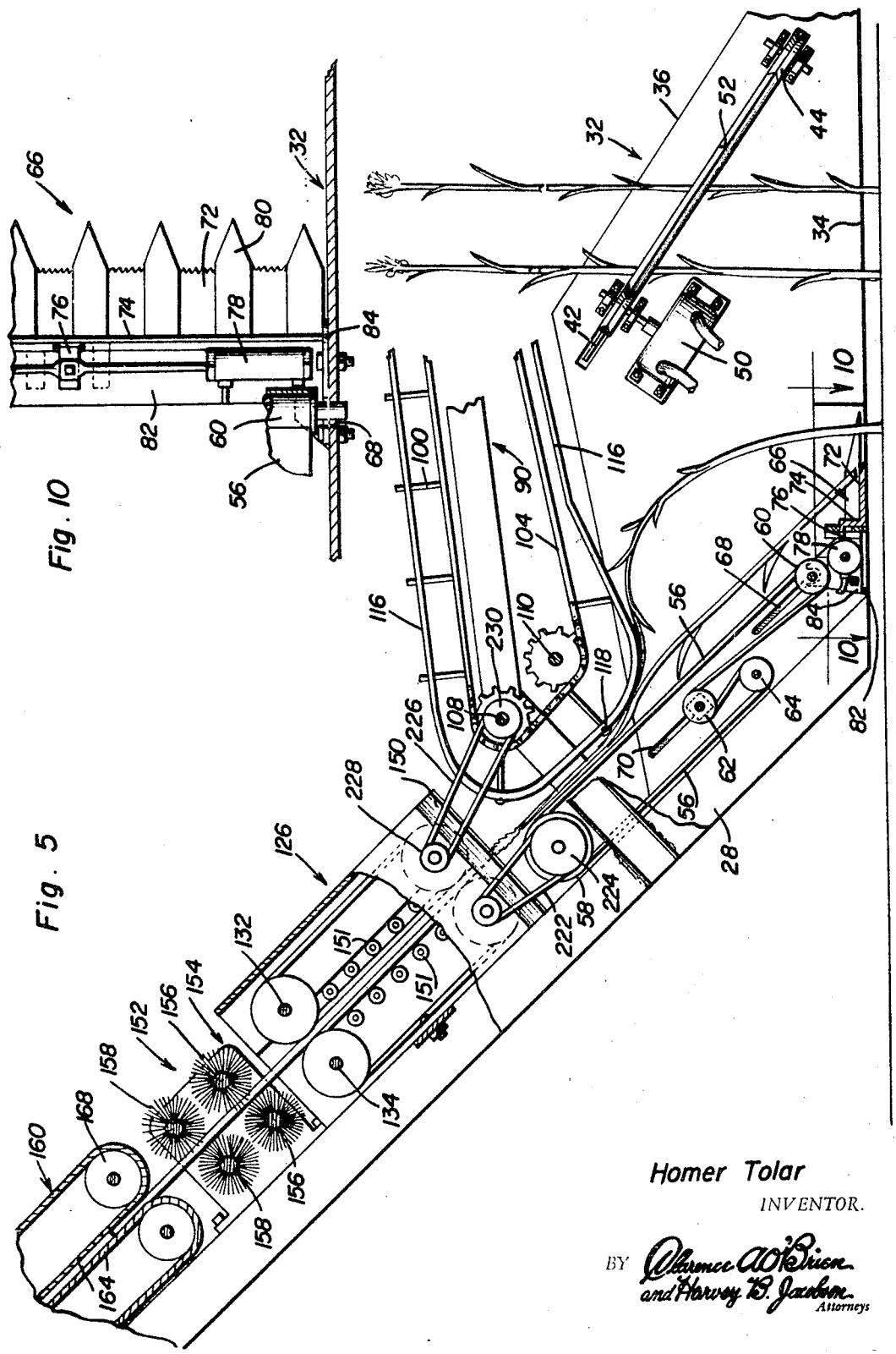

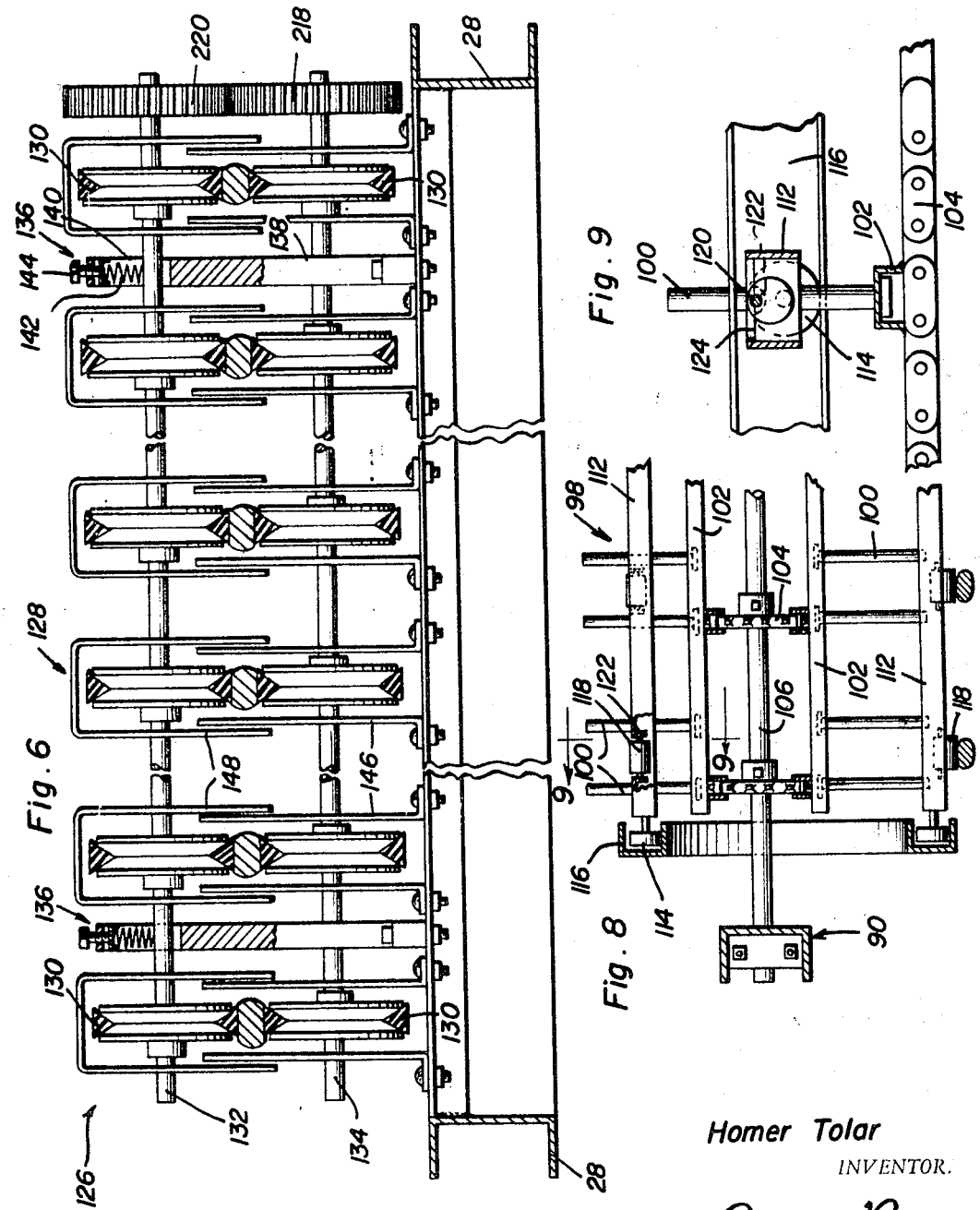

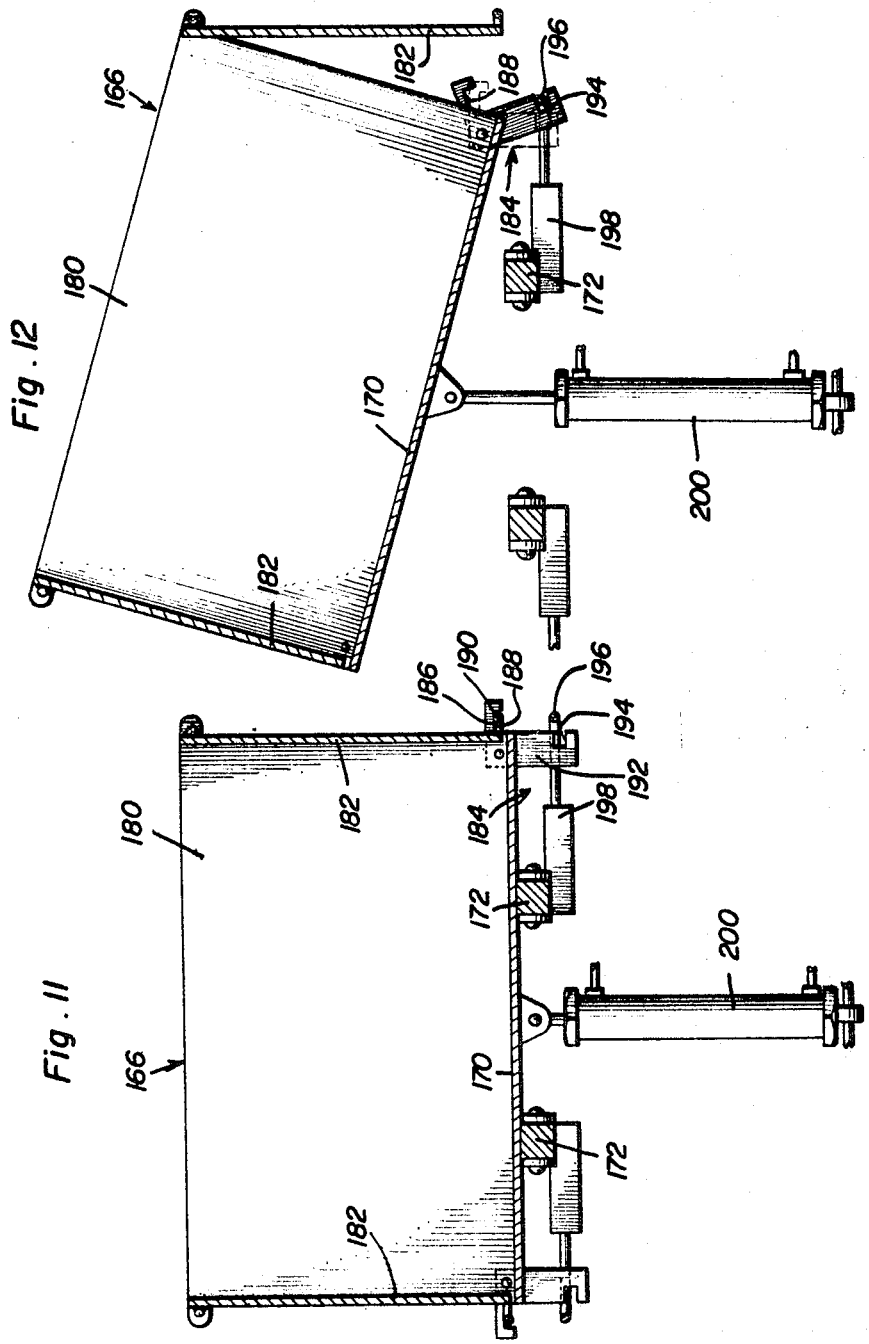

United States Patent Office 3,460,324
Patented Aug. 12, 1969

3,460,324
CANE HARVESTING MACHINE
Homer Tolar, Hilo, Hawaii, assignor of twenty-five
percent to Charles A. Tolar, Shreveport, La.
Filed Feb. 10, 1966, Ser. No. 526,565
Int. Cl. A01d 45/10
U.S. Cl. 56—15                       11 Claims

ABSTRACT OF THE DISCLOSURE

A machine for harvesting sugar cane including in combination means for inwardly gathering and rearwardly collecting stalks in conjunction with overlying stalk separating combing elements which engage and separate the stalks for movement by appropriate stalk feeding and carrying means though cleaning means for cleaning the individual stalks subsequent to which the stalks are discharged into an appropriate storage and dumping hopper.

---

The present invention generally relates to crop harvesting apparatus, and is more particularly concerned with a harvesting machine for sugar cane.

It is a primary object of the instant invention to provide a machine which is capable of effectively cutting, cleaning, loading and transporting the cane so as to substantially reduce the expenditure in both time and effort normally associated with the harvesting of the cane.

In conjunction with the above object, it is considered significant that the machine of the instant invention will result in the retrieving of a substantially clean product, eliminating the fodder, dirt, etc. which, in the normal harvesting operation, would be hauled to the mill along with the cane. In this manner, the mill cost for the processing of the cane will also be substantially reduced.

In the harvesting of the cane, it is considered a significant object of the instant invention to provide for the individual handling of substantially every stalk with the single stalk being severed and subsequently thoroughly cleaned before deposit in a collecting hopper.

In addition, it is a significant object of the instant invention to provide a machine which, during the operation thereof, will initially move the stalks of a traversed row toward a combing unit wherein the individual stalks are segregated from each other for individual feeding through the cleaning portion of the machine.

Further, it is an important object of the instant invention to provide a machine which can be adapted so as to provide for either a positive cutting of the individual stalks just above the ground level, or a physical pulling of the stalks from the ground, the cleaning operation insuring, in either case, a debris free loaded product.

Further, it is a significant object of the instant invention that a loading hopper be incorporated into the machine for receiving the harvest product, the hopper being capable of retaining a large number of stalks and subsequently dumping the stalks at an appropriate location.

In addition, it is considered an important object of the instant invention to provide a machine which is adjustable in nature so as to accommodate various terrains, and is of a highly rugged nature capable of continuous trouble-free operation such as would be required in field operated devices.

In conjunction with the above object, it is also a significant object of the instant invention to provide a harvesting machine which can be conveniently mounted upon a conventional farm vehicle or tractor and easily controlled therefrom with the entire harvesting operation being accomplished by the machine itself.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a top plan view of the harvesting machine with portions of the subjacent structure removed for purposes of clarity;

FIGURE 3 is a rear elevational view of the machine;

FIGURE 4 is a front elevational view of the machine with remote portions removed for purposes of clarity;

FIGURE 5 is an enlarged partial cross-sectional view taken substantially on a plane passing along line 5—5 in FIGURE 2 illustrating particular details of the machine;

FIGURE 6 is an enlarged partial cross-sectional view taken substantially on a plane passing along line 6—6 in FIGURE 1;

FIGURE 7 is an enlarged partial cross-sectional view taken substantially on a plane passing along line 7—7 in FIGURE 1;

FIGURE 8 is an enlarged partial cross-sectional view taken substantially on a plane passing along line 8—8 in FIGURE 1;

FIGURE 9 is an enlarged partial cross-sectional view taken substantially on a plane passing along line 9—9 in FIGURE 8;

FIGURE 10 is an enlarged partial cross-sectional view taken substantially on a plane passing along line 10—10 in FIGURE 5;

FIGURE 11 is a cross-sectional view taken substantially on a plane passing along line 11—11 in FIGURE 1 illustrating the hopper in its loading position;

FIGURE 12 is a view similar to FIGURE 11 illustrating the hopper in its dumping position; and FIGURE 13 is a cross-sectional detail illustrating the concave cross-section of the periphery of the cleaning brushes.

Figure 1:
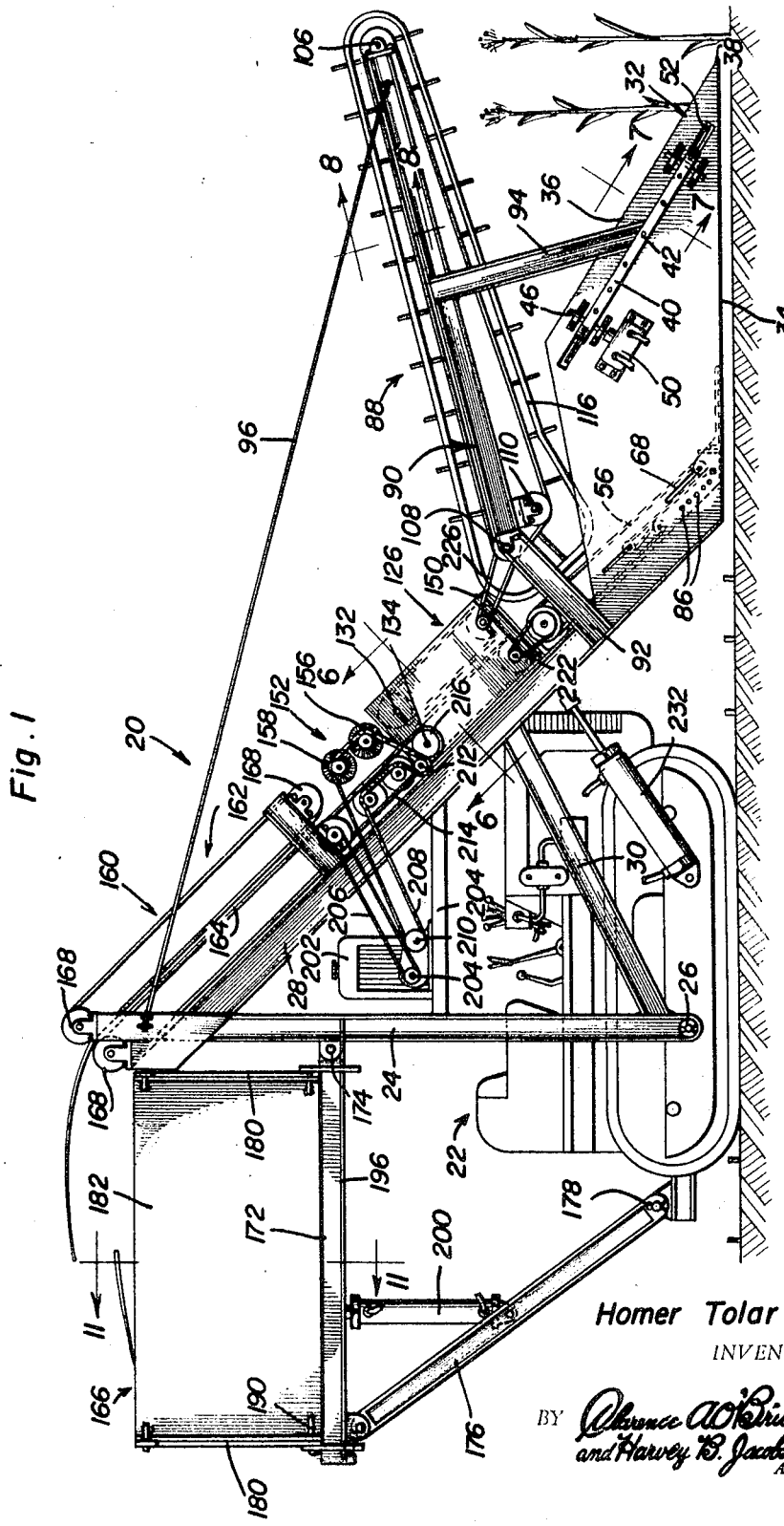
FIGURE 1 is a side elevational view of the harvesting machine of the instant invention including a crawler-type farm tractor.

Referring now more specifically to the drawings, reference numeral 20 is used to generally designate the cane harvesting machine comprising the instant invention. The harvesting machine 20 is to be mounted upon and usable in conjunction with a conventional crawler-type farm tractor 22.

The basic supporting framework of the machine 20 includes a pair of elongated vertical columns 24, one positioned on each side of the vehicle 22 with these columns having the lower ends thereof pivotally mounted on the vehicle 22 as generally indicated at 26. Fixed adjacent the upper ends of the columns 24 are a pair of forwardly and downwardly inclined mounting beams 28 which are stabilized by a pair of diagonal braces 30 rigidly engaged between the lower portions of the columns 24 and approximately the center of the beams 28. Both the columns 24 and the beams 28 are rigidly interconnetced by a series of suitable transverse braces, with the beams 28, as well as the intermediate bracing structure therebetween, constituting the major support unit for the various elements of the harvester as shall be described in more detail presently.

Commencing at the forward end of the machine 20, it will be noted that several pairs of transversely spaced gathering wings 32 are provided, these wings 32 consisting of vertically orientated flat plates rigidly affixed along their rear edges to either the main mounting beams 28 or suitable bracing structure provided therebetween. The gathering plates or wings 32 each include a substantially planar lower edge 34 which is to travel just above the ground level, and an inclined forward edge 36 diverging, relative to the lower edge 34, rearwardly from a leading point 38. Mounted on each of the gathering wings 32 of each of the cooperating pairs of wings, and paralleling the inclined forward edge 36 thereof which is at generally a 30° angle to the horizontal, is an endless belt 40 having a plurality of gathering fingers 42 projecting therefrom at equally spaced points there along. Each belt 42 is mounted on spaced pulleys 44 which in turn are mounted on suitable shafts 46 journaled within upper and lower outwardly projecting mounting ears 48. One of each of such pulleys 44 are to be driven by motor means which might be in the nature of a hydraulic motor 50 controllable from the operator's seat on the vehicle 22. Each of the gathering wings 32 has an elongated slot 52 defined therein, the gathering fingers 42 projecting through this slot into slightly offset overlapped relationship with the corresponding fingers 42 of the belt 40 mounted on the second gathering wing 32 of the pair of wings. In this manner, as the machine moves forward into the cane, the stalks will be gathered between the corresponding gathering wings 32 of each of the pairs of wings with the cooperating gathering fingers 42 acting so as to straihten and move the stalks inwardly, upwardly and rearwardly as the machine 20 advances. With reference to FIGURE 7, it will be noted that suitable bracing 54 can be provided between the adjacent gathering wings 32 of adjacent pairs of wings. Further, in order to insure the proper introduction of the stalks between the cooperating wings of each pair of wings 32 the forward ends of the wings can be flared, or suitable deflectors can be provided between adjacent pairs of wings.

Mounted rearwardly of the pairs of gathering wings 32 is a wide cane stalk conveying feed belt 56 which is of a width substantially equal to the full width of the machine 20 so as to back up the entire gathering unit defined by the pairs of wings 32 and the gathering fingers 42 and which is longitudinally slotted so as to accommodate the wings 32. This feed belt 56 parallels the inclined mounting beams 28 and is mounted immediately thereabove on an upper driven roller 58, a lower roller 60, and two intermediate idler rollers 62 and 64. The upper roller 58 is to be shaft mounted upon suitable bearing blocks, while the rollers 60, 62 and 64 can be shaft mounted directly to the rear portions of the gathering wings 32. The lower rollers 60 is to be longitudinally adjustable along the beams 28 so as to vary the position of the lower end of the belt 56 so as to correspond with a vertical adjustment of the cutter unit 66 as shall be explained presently. Accordingly, elongated mounting slots 68 are provided for the shaft of the roller 60, and, so as to maintain the proper tension in the belt, similar elongated mounting slots 70 are provided for the idler roller 62, with a simultaneous adjustment of the rollers 60 and 62 resulting in a variation in the position of the lower end of the feed belt 56 without effecting the operation thereof.

The cutting or stalk severing unit 66, referring to FIGURE 10 for the particular details thereof, includes a full width cutter blade 72 which is mounted, through a vertical rear flange 74 and a mounting arm 76, for rapid transverse reciprocation in a manner so as to quickly and cleanly sever the stalks brought into contact therewith. The actual reciprocation of the blade 72 is to be effected by a pair of oppositely acting hydraulic piston and cylinder units 78 having the projecting pistons thereof engaged with the mounting arm 76. The blade 72 is to be protected by a series of overlying forwardly projecting guards 80 which tend to deflect any rocks or the like. Possible damage to the blade 72 is also avoided by the use of relatively small teeth thereon in conjunction with a very rapid movement of the blade. The hydraulic units 78 are mounted upon a beam 82 which traverses the width of the machine 20 and includes mounting plates 84 fixed to the opposite ends thereof, these mounting plates 84 in turn being selectively bolted to the endmost gathering wings 32. These endmost wings 32 are to be provided with means for enabling an adjustment of the cutting unit 66, such as for example the series of bolt-receiving mounting holes 86 illustrated in FIGURE 1. It will also be appreciated that, if so desired, the cutting unit 66 can be removed entirely with the stalks being physically pulled from the ground rather than severed as shall be described subsequently. Inasmuch as the cutting unit 66 is to be continuous transversely across the machine 20, it will of course be appreciated that the bottom rear portions of the intermediate gathering wings 32 are to be cut out so as to allow for the accommodation of the cutting unit 66.

Mounted above the upper portion of the feed belt 56 and projecting forwardly and upwardly therefrom so as to overlie the gathering units defined by the wings 32 and gathering fingers 42, is the stalk combing and separating unit 88. This unit 88 is supported by an elongated upwardly and rearwardly inclined framework 90 positioned through braces 92 affixed to the rear end thereof and extending downwardly into rigid engagement with the framework defined by the inclined beams 28 and the braces therefor, and by rigid beam-like braces 94 engaged with approximately the central portion of the framework 90 and rigidly affixed to the gathering wings 32. Also, in order to support the forward outermost extremity of the combing unit 88, elongated tension cable means 96 are engaged therewith and extend therefrom rearwardly to the upper end of the framework defined by the vertical columns 24.

The combing unit 88 includes a plurality of sets of combing elements 98, two such sets of elements 98 normally being associated with each pair of cooperating gathering wings 32 and in general overlying alignment therewith so as to effect a desired combing of the stalks gathered thereby as shall be described presently. Each of the sets of combing elements includes a plurality of outwardly projecting pairs of laterally spaced rod-like combing fingers 100. The corresponding pairs of fingers 100 in each of the combing elements, which are spaced transversely across the combing unit 88, are secured to a common beam 102 with the beams 102 being longitudinally spaced along a series of parallel carrying chains 104. The carrying chains 104 are gear mounted upon a rotating shaft 106 positioned at the upper forward extremity of the supporting frame 90, a second driven shaft 108 mounted on the lower rear portion of the framework 90, and a third rotating idler shaft 110 depending from the framework 90 just forward of the rear end thereof in a position so as to produce a short run of the carrying chains, and consequently combing fingers 100, parallel to the upper surface of the carrying belt 56. From this structure, it will be appreciated that as the shaft 108 is driven, the gears thereon will effect a continuous rotation of the carrying chains 104 and a rearward downward movement of the pairs of combing fingers 100 in a manner so as to separate and rearwardly direct the gathered stalks toward the feed belt 56, each pair of combing fingers 100 normally accommodating a single stalk therebetween.

In order to effect a proper discharge of the stalks from the combing unit 88, a second transversely elongated bar 112 is provided parallel to and outwardly spaced from each of the beams or bars 102. The bars 112 are longitudinally slidable upon the transversely aligned corresponding pairs of fingers 100 with the opposite extremities of each of the bars 112 having a roller 114 mounted thereon and guided within an endless track 116 positioned outwardly thereof and following the path of the inner carrying chains 104. These opposed tracks 116 determine the position of the bar 112 on the fingers 100 during the course of travel effected by the carrying chains 104. With particular reference to FIGURES 1 and 5, it will be noted that the side tracks or guides 116 parallel the carrying chains 104 at an outwardly spaced point well inward of the outer extremities of the combing fingers 100 both forwardly along the upper run of the combing unit 88, and rearwardly along the lower run to a location just forward of the idler shaft 110 as the carrying chains 104 approach the point at which they parallel the belt 56. At this point, the guides 116 diverge gradually outward away from the carrying chains 104 in a manner so as to move the guided roller supported bars 112 outwardly to the outer extremities of the pairs of combing fingers 100 during the passage of these bars 112 along the upper portion of the feed belt 56. In this manner, the combed stalks will be forced outwardly of the individual combing elements onto the upper portion of the feed belt 56 for subsequent directing into the next stalk-handling unit. In order to insure a proper gripping of the stalks between the combing elements as they are positioned upon the feed belt 56, and in order to facilitate the discharge of the individual stalks, it will be noted that each combing element includes, mounted between the pair of combing fingers 100 associated therewith, an eccentric roller 118. Each of these rollers, referring to FIGURES 8 and 9, is mounted for free rotation upon a shaft 120 suitably journaled between depending ears 122 within the corresponding stalk-discharging bar 112. The lobe portion of each of the eccentric rollers 118 is to be such so as to project outwardly through the web portion of the corresponding stalk-discharging bar 112, a suitable aperture 124 being provided therefor, along the lower run of the combing unit 88, noting the lower portion of FIGURE 8. By the same token, along the upper run of the combing unit 88, the eccentric rollers 118 will normally be substantially completely retracted within the bars 112. The projection of the lobe portions of the rollers 118 along the lower run of the combing unit 88, especially as the feed belt 56 is approached, will insure a proper gripping of the stalks and what amounts to a clamping of the stalks against the upper run of the feed belt 56. In addition, inasmuch as the stalks are to be physically pulled from the feed belt, the eccentricity of the rollers 118 will result in a ready release of the stalks at the appropriate time as they are being drawn into the next cane-handling unit.

Paralleling the frame beams 28 and mounted rearwardly and upwardly of the feed belt 56 and combing unit 88 is a carrying unit 126. This carrying unit, detailed in FIGURE 6, includes a plurality of carrying elements 128, one aligned with each set of combing elements 98 for the reception of the individual stalks therefrom. Each of the carrying elements 28 includes elongated pulley mounted upper and lower stalk carrying V-belts 130. The center or adjacent stalk-receiving runs of the upper and lower narrow belts 130 are to be aligned in spaced relation with each other slightly above the upper run of the feed belt 56 so as to smoothly receive the individual stalks therefrom, these stalks having been appropriately segregated by the combing unit 88. It is contemplated that each of the carrying elements 128 firmly grip and effect a positive pull on the stalks, the carrying belts 130 moving more rapidly than the feed belt 56. As such, the forward and rear upper pulley mounting shafts 132 are to be spring-biased downwardly toward the corresponding lower pulley mounting shafts 134, thereby biasing the upper carrying belts toward the lower carrying belts and effecting a clamping of the stalks therebetween. The spring-biased pressure of the upper belts 130 against the lower belts 130 is effected through biasing units 136, each unit including a pedestal 138 having a vertically elongated shaft journaling slot 140 receiving the corresponding upper shaft 132, an expanded compression coil spring 142 engaged against the upper portion of the shaft 132, and a biasing force adjusting screw 144 engaged against the upper portion of the corresponding spring 142 so as to vary the resistance to upward movement of the shaft 132.

Each of the carrier elements 128 is to include an elongated open-ended housing comprising a lower housing portion consisting of two spaced elongated vertically orientated side plates 146 apertured so as to received the lower shafts 134 therethrough, and an upper portion in the nature of an inverted U-shaped cover 148, the legs of which telescopically receive the vertical side plates 146 of the lower portion as the portion 148 moves vertically relative to the lower portion in response to the spring resisting movement of the upper belts 130 and the shafts 132 mounting these belts. The forward ends of the upper and lower housing portions are to outwardly flared as at 150, note FIGURES 1, 2 and 5, so as to facilitate and insure a proper introduction of the stalks thereinto. Incidently, as will be noted in FIGURE 5, the central stalk-receiving runs of the carrying belts 130 are suitably backed by idling rollers 151 so as to maintain the pressure on the stalks along the length thereof.

Mounted above the carrying units 126, and in alignment therewith, is the cleaning unit 152. The cleaning unit 152 consists of a plurality of cleaners 154, one aligned with each of the carrier elements 128. Each of the cleaners 154 includes front shaft driven upper and lower circular wire brushes 156 and rear upper and lower shaft driven circular flays 158. With reference to the detail of FIGURE 13, it will be noted that the outer peripheries of the wire brushes 156 are to include concave recesses therein so as to facilitate the accommodation of the brushes to variations in the size of the cane stalks. The upper brushes 156 and flays 158 are to be spring-biased toward the lower brushes 156 and flays 158 by the utilization of spring-biasing units similar to 136 detailed in connection with the carrier elements 128. Further, both the brushes 156 and flays 158 are to be driven in a rotational direction opposed to the direction of travel of the cane stalks with the flays, consisting of strips of durable and generally flexible material, functioning so as to beat off any remaining dirt or the like that may have not been removed by the wire brushes 154. Incidentally, if so desired, side guide plates can be provided for guiding the stalks through each of the individual cleaners 154.

Paralleling the supporting beams 28 rearward and upward of the cleaning unit 152 is the final conveying unit 160. The conveying unit 160 consists of two elongated belts of a transverse width generally equal to the width of the machine 20 so as to lie across the discharge end of all of the cleaners 154. These conveyor unit belts, generally referred to by reference numeral 162, are arranged in superimposed relation to each other with the central runs 164 thereof spaced from each other a distance so as to snugly receive the cleaned stalks therebetween for an upward and rearward movement of the stalks into the rearwardly located collecting hopper 166. The belts 162 are engaged over upper and lower shaft-mounted rollers 168 with the upper roller being mounted either on or directly adjacent to the upper ends of the support columns 24 and with the lower ends of the rollers being suitably mounted upon the framework defined by the beams 28.

The hopper 166 is rectangular in shape and includes a bottom 170 freely resting upon a pair of rearwardly extending support beams 172 which are hingedly mounted, as at 174, to the vertical framework defined by the columns 24, and which are also hingedly supported at the outer ends thereof by a vertical Y-shaped brace member 176 which in turn is pivotally engaged with the tractor as at 178. The hopper 166 also includes, in addition to fixed end walls 180, opposed side walls 182 which are hingedly engaged at the upper edges thereof for pivotal movement of the lower edges thereof outwardly relative to the hopper, note particularly FIGURE 12, so as to permit a discharge of the collected stalks.

Each of the end walls 180, adjacent the lower ends of the two side walls or panels 182, has a right angular latch bar 184 pivoted thereto for movement parallel to the corresponding end wall 180. Each of these latch bars 184 includes a horizontal arm 186 projecting laterally beyond the corresponding side panel 182 with this horizontal arm 186 including a downwardly opening keeper recess 188 which is freely received over a lock bar 190 fixed to the side panel 182 and projecting therefrom. In this manner, outward movement of the side panels 182 is prevented. Each of the latches or latch members 184 further includes a depending leg 192 having an outwardly directed keeper notch 194 therein. Positioned outwardly of the keeper notches 194 of the front and rear latches 184 on each side of the hopper is an elongated pivot rod 196, this rod being rigidly positioned through one or more laterally directed supports 198 fixed to the adjacent hopper-supporting beam 172, as well as through welded engagement with the corresponding support column 24. The dumping of the hopper, effected through a tipping thereof as illustrated in FIGURE 12, is to be effected by means of one or more hydraulic jacks 200 pivotally engaged with the bottom 170 of the hopper along the centerline thereof and pivotally supported on the subjacent diagonal bracing memebr 176. Immediately prior to dumping, the latches 184 on that side of the hopper unit 166 toward which the load is to be dumped are pivoted, as indicated in phantom lines in FIGURE 12, so as to release the lock rods 190 and engage the pivot rod 196 within the pair of aligned rod keepers 94. This movement of the latches can be effected in any suitable manner, such as through cable controls. Upon an engagement of the two latches 184 with the pivot rod 196, the hydraulic jack 200 is actuated forcing the hopper 166 upwardly which in turn results, through the pivotal engagement of the latched side of the hopper, in a pivoting of the hopper and an outward swinging of the unlatched side panel 182, thus allowing for a side discharge of the collected cane stalks. The opposite side panel 182 will remain locked. Upon an emptying of the hopper 166, the hydraulic jack 200 is retracted and the hopper pivoted back into position upon the support beams 172, at which time the dumping side latches 184 are released from the pivot rod 196 and re-engaged with the adjacent rods 190 so as to ready the hopper for the reception of a fresh batch of stalks.

A central power plant 202 is mounted on a framework 204 extending between the framework defined by the columns 24 and that defined by the beams 28. This power plant 202, from a first drive shaft 204 thereon, and through an endless belt 206, drives the rear roller 168 of the lower conveyor belt 162 of the conveyor unit 160, with the upper belt 162 idling and moving through the engagement of the lower run thereof against the received stalks. The cleaning unit 152 is driven by an endless belt or chain 208 from a second drive shaft 210 with the chain 208 being entrained about suitable gearing on the cleaning unit shafts in a manner whereby the rotational direction of the brushes 156 and flays 158 is opposite from that of the conveying units 160 and 126. This can be achieved by engaging all of the cleaning unit gears over the upper portion thereof as best seen in FIGURE 1, suitable idler gears 212 being provided as needed.

The carrying unit 126 is driven from the rear lower roller 168 of the conveying unit 160 by an endless belt or chain 214 extending therefrom to and about a suitable gear 216 on the lower rear pulley shaft 134. The remote end of the shaft 134 includes an enlarged gear 218 thereon which is in turn drivingly meshed with an enlarged gear 220 on the corresponding upper shaft 132. In this manner, both the upper and lower carrying belts 130 are driven.

The feed belt 56 is driven from the rear lower shaft 134 of the carrying unit 126 by an endless chain 222 extending between the lower shaft 134 and a suitable gear 224 mounted on the rear feed belt shaft 58.

The combing unit 88 is driven from the upper rear shaft 132 of the carrying unit 126 by an endless belt or chain 226 drivingly engaged with a first gear or pulley 228 mounted on the shaft 132 and a second gear 230 mounted on the rearmost chain gear supporting shaft 108 of the combing unit.

Inasmuch as the cane harvesting machine 20 is to be utilized under varying ground conditions, it is desirable that means be provided for effecting some degree of vertical adjustment thereof. This is achieved through the provision of a pair of hydraulic jacks 232 pivotally engaged between the tractor 22 and the framework defined by the beams 28 below the braces 30, an extension of the hydraulic jacks 232, one appearing on each side of the tractor 22, effecting a slight raising of the unit, with a lowering of the unit resulting from a retraction of the hydraulic jacks 232.

In operation, as the machine 20 is advanced upon the stalks, the stalks are gathered inwardly by the gathering wings 32 and moved upwardly and rearwardly by the cooperating gathering fingers 42. As the stalks move rearwardly into the gathering unit, the combing unit engages the upper portions of the stalks, separating them into individual stalks and moving them rearwardly and downwardly into clamped engagement with the feeder belt 56 from whence the stalks are directed into the individual carrying elements of the carrying unit 126. It is contemplated that, assuming the stalks are to be severed by the cutting bar unit 66 rather than pulled directly from the ground, the severing occur upon a clamping engagement of the stalks between the combing unit and the upper portion of the feed belt 56. As the stalks are engaged by the carrying elements 128, they are, through the relatively greater speed of the carrying unit 126, rapidly pulled from between the feed belt 56 and the combing unit 88 with this withdrawal of the stalks being facilitated by the utilization of eccentric rollers as a means for engaging the stalks against the belt 56. The stalks are rapidly projected through the carrying elements 128 and discharged through the cleaning unit 152 wherein the stalks are first engaged by upper and lower wire brushes rotating in a direction opposed to the direction of movement of the stalks, and subsequently by similarly rotating flays which insure a complete removal of the foliage, dirt, etc. Upon leaving the cleaning unit 152, the stalks are carried by a conveying unit 160 upwardly for discharge into a rearwardly positioned hopper 166. Upon a loading of the hopper 166 and a transporting of the cut cane to a central collection point, the hopper is pivotally elevated so as to discharge the cane toward either side thereof, thus completing the harvesting of the cane.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to.

What is claimed as new is as follows:

1. A stalk harvesting machine comprising a supporting frame, stalk gathering means mounted on said frame for inwardly gathering and rearwardly collecting stalks, stalk separating means mounted on said frame for receiving stalks from the gathering means and substantially individually segregating said stalks, stalk carying means mounted on said frame for separately removing and conveying the separated stalks from the separating means, cleaning means mounted on the frame for receiving the separated stalks from the carrying means and individually cleaning said stalks while retaining the separation thereof, stalk storage means mounted on said frame, means for conveying stalks from the cleaning means to the storage means, said stalk separating means overlying said gathering means and including a plurality of depending downwardly opening rearwardly movable combing elements engageable with individual stalks for effecting a rearward movement of the upper portion of the individual stalks from the gathering means, and rearwardly movable stalk feeding means underlying and paralleling a portion of the separating means adjacent the rear thereof, the combing elements, upon rearward movement thereof, engaging the individual stalks against the feeding means under pressure whereby a rearward pull will be exerted on the stalks upon a rearward movement of both the combining elements and the feeding means.

2. The machine of claim 1 wherein said combing elements are provided in laterally spaced sets, each element comprising a transverse carrier bar, a pair of spaced outwardly projecting fingers on said carrier bar, a stalk discharging bar paralleling the carrier bar and mounted on said fingers for movement along the length thereof and means for controlling the movement of the discharging bar and effecting an outward movement of the bar as the corresponding fingers approach the feeding means.

3. The machine of claim 2 wherein said carrying means comprises a plurality of carrying elements, each carrying element comprising upper and lower narrow cooperatively movable belts, means resiliently biasing said belts toward each other for the clamping reception of a stalk therebetween, and laterally spaced side plates positioned on opposite sides of said belts.

4. The machine of claim 3 wherein said cleaning means comprises a plurality of cleaners, each of said cleaners comprising upper and lower cleaning wheels, means for effecting a rotational driving of said wheels, and means resiliently biasing the upper and lower wheels toward each other.

5. The machine of claim 4 including stalk severing means mounted on said frame generally in alignment with and forward of the forward end of the stalk feeding means.

6. The machine of claim 5 wherein said stalk storage means comprises an enlarged hopper, said hopper including a bottom, a pair of end walls and a pair of opposed pivotally mounted side walls, control means for selectively fixing and releasing each of said side walls, and dumping means for effecting a selective pivotal dumping of said hopper toward either side wall.

7. The machine of claim 6 including support means freely receiving said hopper, said control means effecting a pivotal engagement of the corresponding side of the hopper bottom with a rigid portion of the frame simultaneously with release of the adjacent side wall, said dumping means comprising a selectively extensible jack engaged between the frame and the center of the bottom wall.

8. The machine of claim 7 including means for pivotally adjusting the orientation of the frame and the height of the stalk severing means.

9. A stalk harvesting machine comprising a supporting frame, stalk gathering means moutned on said frame for inwardly gathering and rearwardly collecting stalks, stalk separating means mounted on said frame for receiving stalks from the gathering means and substantially individually segregating said stalks, stalk carrying means mounted on said frame for separately removing and conveying the separated stalks from the separating means, cleaning means mounted on the frame for receiving the separated stalks from the carrying means and individually cleaning said stalks while retaining the separation thereof, stalk storage means mounted on said frame, and means for conveying stalks from the cleaning means to the storage means, said carrying means comprising a plurality of carrying elements, each carrying element comprising upper and lower narrow cooperatively movable belts, means resiliently biasing said belts toward each other for the clamping reception of a stalk therebetween, and laterally spaced side plates positioned on opposite sides of said belts.

10. A stalk harvesting machine comprising a supporting frame, stalk gathering means mounted on said frame for inwardly gathering and rearwardly collecting stalks, stalk separating means mounted on said frame for receiving stalks from the gathering means and substantially individually segregating said stalks, stalk carrying means mounted on said frame for separately removing and conveying the separated stalks from the separating means, cleaning means mounted on the frame for receiving the separated stalks from the carrying means and individually cleaning said stalks while retaining the separation thereof, stalk storage means mounted on said frame and means for conveying stalks from the cleaning means to the storage means, said stalk storage means comprising an enlarged hopper, said hopper including a bottom, a pair of end walls and a pair of opposed pivotally mounted side walls, control means for selectively fixing and releasing each of said side walls, and dumping means for effecting a selective pivotal dumping of said hopper toward either side wall.

11. The machine of claim 10 including support means freely receiving said hopper, said control means effecting a pivotal engagement of the corresponding side of the hopper bottom with a rigid portion of the frame simultaneously with release of the adjacent side wall, said dumping means comprising a selectively extensible jack engaged between the frame and the center of the bottom wall.

References Cited

UNITED STATES PATENTS

| | | | |
|---|---|---|---|
| 798,534 | 8/1905 | Sharp | 56—17 |
| 1,583,510 | 5/1926 | Wilkes et al. | 130—31 |
| 1,648,313 | 11/1927 | Luce | 56—17 |
| 1,808,113 | 6/1931 | Howard | 56—17 |
| 2,669,823 | 2/1954 | Kramer | 56—15 |

HUGH R. CHAMBLEE, Primary Examiner

U.S. Cl. X.R.

56—17